Nov. 4, 1958 — A. M. HEXDALL — 2,858,781
HEAT STORAGE DEVICE
Filed May 28, 1956 — 2 Sheets-Sheet 1
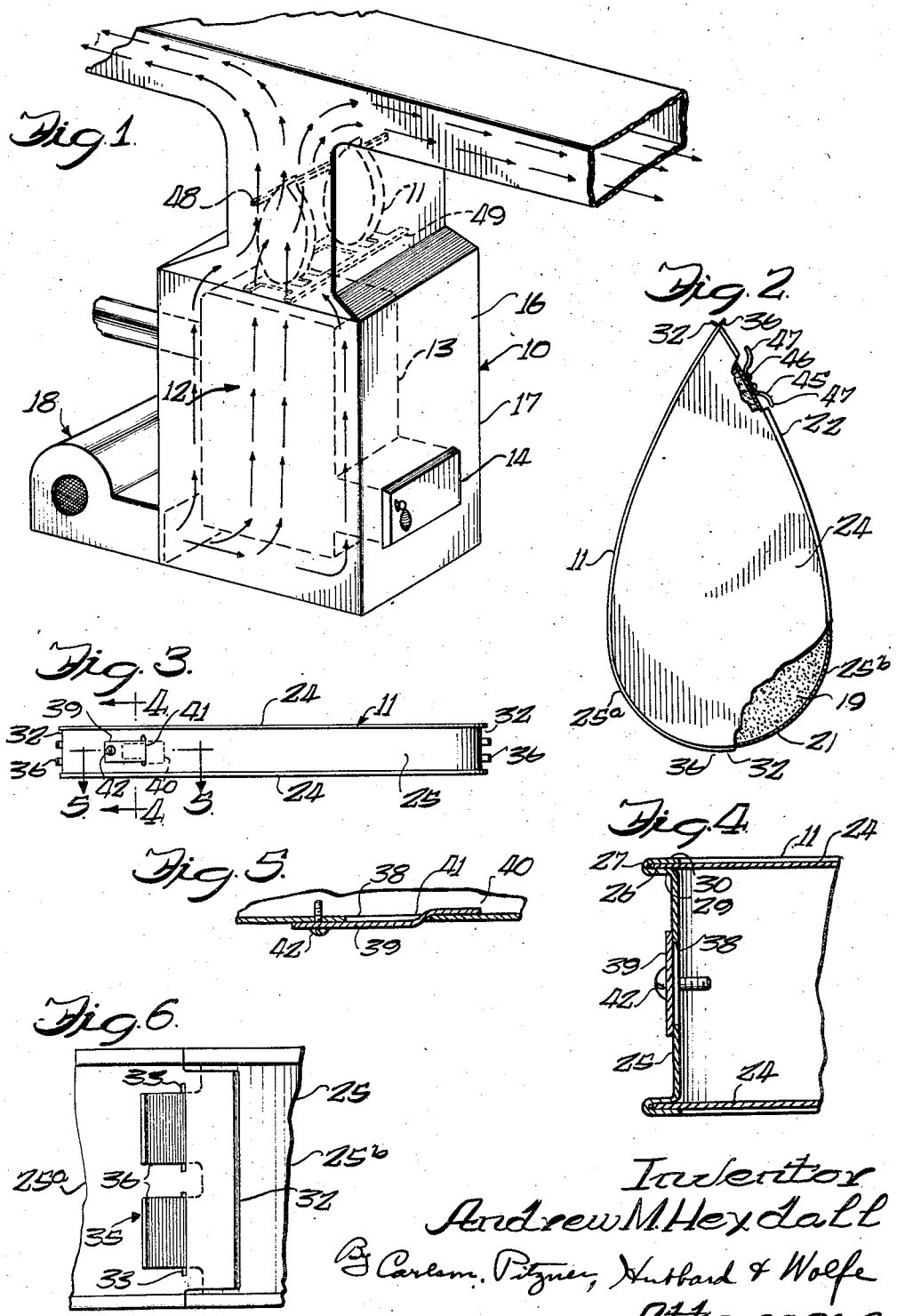
Inventor
Andrew M. Hexdall
By Carlson, Pitzner, Hubbard & Wolfe
Attorneys Nov. 4, 1958
A. M. HEXDALL
2,858,781
HEAT STORAGE DEVICE
Filed May 28, 1956
2 Sheets-Sheet 2
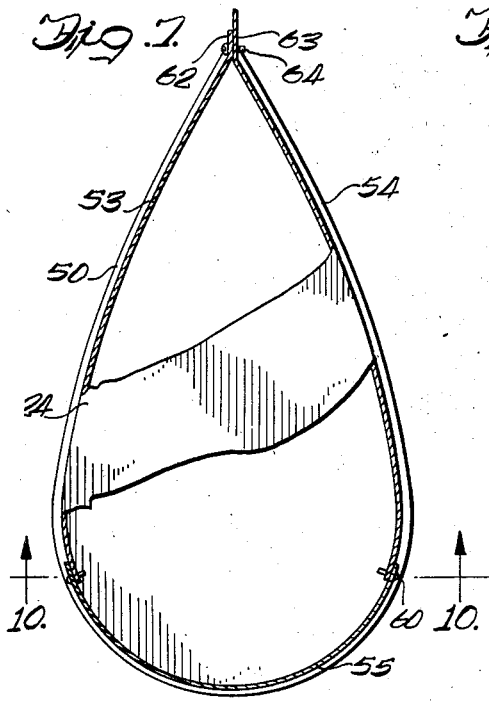
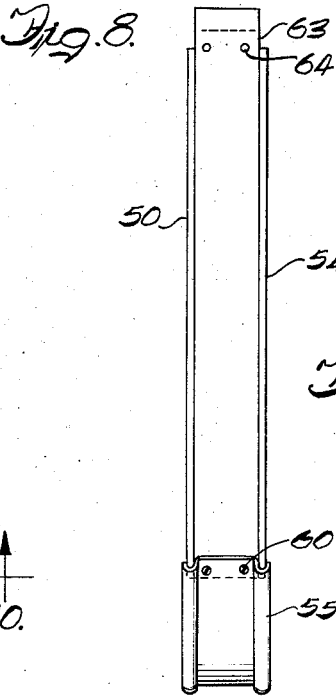
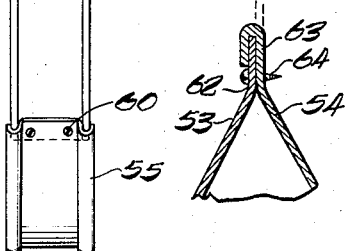
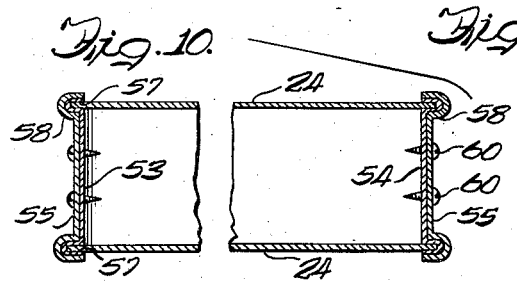
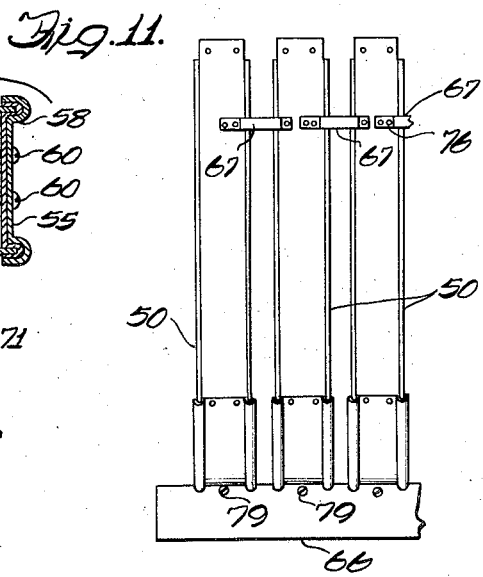
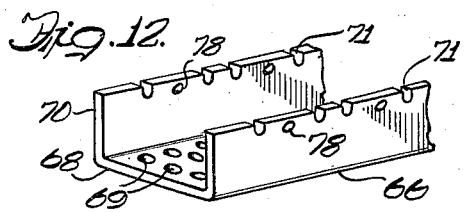
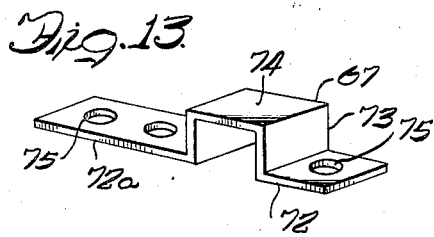
Inventor
Andrew M. Hexdall
By Carlson, Pitzner, Hubbard & Wolfe
Attorneys

United States Patent Office 2,858,781
Patented Nov. 4, 1958

2,858,781

HEAT STORAGE DEVICE

Andrew M. Hexdall, Morris, Ill.

Application May 28, 1956, Serial No. 587,872

7 Claims. (Cl. 110—97)

The present invention relates to a heat storage device for use in connection with heaters, and is particularly adapted for use in household furnaces although its utility is not limited to such use.

It is an object of the present invention to provide a device for minimizing abrupt changes in the temperature of the heat delivered by a heater or furnace.

Another object of the present invention is to provide a heat storage device capable of absorbing and storing heat at high temperature when the heater or furnace is operating and subsequently to release gradually the stored heat when the heater or furnace stops or operates at reduced temperatures.

A more detailed object of the invention is to provide a heat storage device having the foregoing characteristics which offers a minimum of resistance to the heat transfer medium used in the heater or furnace.

It is also an object of the present invention to provide a heat storage device which is of low cost and which may be conveniently and quickly installed either as original equipment in a heating system or as an improvement in existing equipment.

Other objects and advantages of the present invention will become evident as the written description proceeds, taken in connection with the accompanying drawings in which:

Fig. 1 is a schematic illustration of a heating system embodying the present invention.

Fig. 2 is a side view of a heat storage device embodying the present invention.

Fig. 3 is an edge or marginal side view of the heat storage device of Fig. 2.

Fig. 4 is a partial section of a filling opening and closure, taken along the line 4—4 of Fig. 3.

Fig. 5 is another partial section of the filling opening and closure, taken along the line 5—5 of Fig. 3.

Fig. 6 is a detail on an enlarged scale of the end connection for the side walls of the heat storage device.

Fig. 7 is a modified form of heat storage device embodying the present invention shown partially in section.

Fig. 8 is an edge or marginal side view of the device of Fig. 7.

Fig. 9 is a partial section of an end of the device of Fig. 7 shown on an enlarged scale.

Fig. 10 is a section taken along the line 10—10 of Fig. 7.

Fig. 11 is an assembly showing three heat storage devices and a mounting therefor.

Fig. 12 is a partial perspective of a mounting member for the heat storage units.

Fig. 13 is a perspective of a bracket used in the assembly of Fig. 11.

While the invention is susceptible of various alternative constructions and modes of use, only certain preferred embodiments of the invention are shown in the drawings and will here be described. It is to be understood, however, that it is not the intention to limit the invention by such disclosure, but it is the aim to cover all modifications and alternatives falling within the spirit and scope of the invention as expressed in the claims.

Referring now to the drawings, Fig. 1 shows partially in schematic form a heater or furnace 10 representative of the hot air type of furnace for domestic or household use. Installed as part of the furnace 10 are heat storage units 11 embodying the present invention.

The illustrated furnace 10 is merely exemplary and its details of construction may be varied as desired. For present purposes, it is sufficient to state that the furnace 10 has a combustion chamber 12 formed by a metal casing 13 and an entrance door 14 through which fuel may be added to the combustion chamber. Surrounding the combustion chamber casing 13 is a space 16 defined by the furnace shell 17 which contains and directs the flow of the heat transfer medium used in the heating system.

At this point, it should be noted that the heater furnace may be fired by any desired fuel, such as coal, gas, oil, electricity, for example. In addition the precise heat transfer medium employed is not critical, although the invention has greatest utility with air or other gas as the heat transfer medium. With either gas or liquid as the transfer medium, the heating installation may employ convection, gravity, or forced flow to circulate the heat transfer medium through the furnace and the distributing duct work or pipes. For illustrative purposes, the arrangement of Fig. 1 utilizes a fan 18 driven by an electric motor or other power means in a forced air system. The intake of the fan 18 may, if desired, be connected to cold air return ducts or pipes (not shown) such as are commonly used in domestic heating plants.

It will be understood that in the case of a forced liquid flow system, a suitable boiler and force pump would be used in place of the air space 16 and fan 18.

In the operation of heating systems the temperature existing in the combustion chamber varies over wide limits. Such temperature variation results in a similarly wide and abrupt change in temperature of the heat transfer medium. This action is especially true of gas transfer medium and to a lesser extent if liquid transfer mediums. By means of the novel heat storage units of the present invention, the temperature of the heat transfer medium flowing from the heater or furnace is moderated and made more uniform over a period of time than is practical by control of the fire or temperature in the combustion chamber.

The foregoing is accomplished in accordance with the present invention by providing one or more heat storage units within the flow of the heat transfer medium which, in the illustrative heat system, is air. Storage units embodying the present invention are so constructed that a large surface area is exposed to the heat transfer medium for rapid absorption of heat and, at the same time, has a minimum of interference with the flow of the transfer medium through the heating system.

Referring to the construction of the heat storage units in more detail, reference is made to Figs. 2, 3 and 4 of the drawing. Each of the units there illustrated comprises a container formed of a non-combustible, and preferably non-corrosive, sheet material such as galvanized iron. Each unit is filled with a suitable heat retaining and refractory material 19. Preferably these materials are of the type having relatively high retaining properties, such for example as sand, small pieces of iron, concrete, glass and similar substances.

To accomplish one of the objects of the present invention, the storage units are streamlined or teardrop shaped in profile, as is best seen in Fig. 2 of the drawing. In somewhat more detail the exemplary unit 11 shown in the drawing is laterally symmetrical about its longitudinal axis. The forward or upstream end portion 21 of the unit is substantially semi-circular in outline. The outline of the rear or downstream end portion 22 of the unit is formed by slightly outwardly bowed lines substantially tangent to the ends of the forward semi-circular outline and converging rearwardly to a point at the rear of the unit.

In accordance with another feature of the invention, the units have substantially plane, parallel side walls 24 spaced relatively close together to form a relatively thin unit. By this arrangement the desired number of units may be conveniently and quickly installed in a heating system. The flat side walls 24 permit side by side installation, as illustrated in Fig. 1, and also permit spacing the units a short distance apart. Such construction gives adequate fluid contacting surface for the conduction of heat from the heat transfer medium to the units and return. The side walls 24 of the units are formed of sheet material, and have an outline of teardrop shape, as previously described.

Maintaining the side walls 24 in spaced relation and inclosing the space between them is a marginal or end wall 25. The end wall 25, like the side walls 24, is formed of sheet material and is bent or curved to conform to the outline of the side walls 24. In the exemplary device the end wall 25 has means at its edges for forming a connection or seal with the side walls 24. As shown in Fig. 4 of the drawing, the sealing or connecting means comprises an inwardly facing groove 26 provided on the edges of the end wall 25. The connection groove 26 is formed by an outwardly extending flange 27 which is reversely bent to form an inwardly opening U-shaped configuration. The marginal edges of the side walls 24 are slipped into the connection groove 26 and, if desired, walls 29, 30 forming the groove may be pressed together to form a tight seal. Preferably, however, the groove 26 is made slightly narrower than the thickness of the side walls 24 so that the walls 29, 30 of the groove are resiliently deformed when the side walls are inserted in the grooves. The resilience of the walls 29, 30 of the grooves thus provides a snug fit.

In accordance with another aspect of the invention, the storage units are arranged for convenient packaging and shipping in knocked-down form, and for fast and simple erecting and installation on the job. The flange and groove connection previously described contributes to this feature, as does the particular two-piece construction of the end wall 25 about to be described.

The end wall or rim section 25 is advantageously formed in two pieces 25a, 25b, each being of approximately equal length and forming the end wall for one-half of the storage unit. Preferably, each end wall section 25a, 25b, encloses the portion of the heat storage unit lying on one side of the longitudinal axis of the unit. The two wall sections 25a, 25b meet and are joined together at the forward and rear ends of the unit to form a continuous end wall.

To further facilitate erection of the unit, an improved fastening means is provided for connecting together the ends of the wall sections 25a, 25b. For this purpose each wall section is somewhat longer than half the periphery of the heat storage unit to provide an overlap at each end of the end wall sections when assembled. At the base of an overlap portion 32 on one end of wall sections 25a are formed a pair of in-line, transverse slots 33. In the mating or corresponding overlap end portion 35 of the other wall section 25b are formed two endwise projecting fingers 36 spaced transversely from each other to extend through respective ones of the slots 33. Upon assembly of the end wall sections 25a, 25b, about the side wall plates 24, the fingers 36 are inserted through the slots 33 and may be bent or crimped to form a tight connection. The connection between the second ends of the two end wall sections 25a, 25b is identical with that described above and is assembled in the same manner.

If desired, the end wall section 25 may be a single piece of sheet material. In this case, only a single connection will be required. The connection may advantageously be the same as that described above and preferably located at the rear end of the unit where the end walls meet at a sharp angle.

To permit filling of the unit with heat retaining material, a filling opening 38 and closure 39 are provided. In the preferred form, a rectangular filling opening 38 is formed in the end wall 25 adjacent the rear or downstream end 22 of the unit. For vertical installations such as illustrated in Fig. 1, this position of the filling opening allows the unit to be filled after installation. The filling opening may, if desired, be placed at other positions on the unit.

A simple, low-cost closure 39 for the filling opening is provided in the form of a rectangular plate of greater width and length than the opening 38 to give a marginal overlap. One end portion 40 of the closure 39 is offset a distance approximately equal to the thickness of the end wall sheet 25, and is inserted through a crosswise slot 41 extending to either side of and in line with one end of the filling opening 38. The second end portion of the closure 39 has a fastener 42, such as a screw, for holding the closure in place over the opening 38. The closure 39 may be manipulated and fastened in position entirely from the outside of the unit, the first end portion 40 abutting against the inside of the end wall 25, while the second end portion overlies the outside of the end wall section. The single fastener 42 is sufficient to hold the closure in place with resort to expensive hinges or other connectors being unnecessary.

It will thus be seen that the entire unit may be assembled on the job with simple hand tools, as a screw driver and pliers. The side wall plates 24 are easily slipped into and are held by the grooved flanges 27 of the end wall section 25. With either the single or two-piece end wall arrangement, the end wall is expandible outwardly to permit insertion of the side wall panels 24 into the retaining grooves. The latter sections are connected together by the novel connection means at their mating ends. The unit is then ready for mounting and filling. After filling, only a single fastener 42 need be fastened to close and complete the assembly.

Illustrated in Figs. 7 and 8 is a heat storage unit 50 having a modified end wall construction and a modified fastening for connecting sections of the end wall together. In this construction, the unit 50 has side walls 24, as in the form of the unit shown in Fig. 2, but the end wall 51 comprises three pieces or sections interconnected to define a closed chamber between the side walls 24. For this purpose, two symmetrical rear end wall sections 53, 54 are joined at the rear ends to enclose the downstream or rear end portion of the unit, and an arcuate end wall section 55 interconnects the forward ends of the rear wall sections 53, 54 to enclose the upstream or forward end of the unit. Preferably, each of the end wall sections will be approximately of equal length for economy in manufacture and saving of space in packaging the unit in knocked down condition.

The edges of the end wall sections 53, 54, 55 are provided with sealing or connecting means for holding the side walls 24 comprising an inwardly facing groove 57 formed in the same manner as in the construction of Fig. 2 by an outwardly extending flange 58. A continuous groove 57 is provided around the unit, except at the rearmost point, by overlapping connections between the forward end wall section 55 and the rear wall sections 53, 54. In order to accomplish this, the groove 57 at the ends of the front wall section 55 is slightly enlarged or widened to fit over and receive the flanges 58 of the rear end wall sections as shown in Fig. 10 of the drawings. Fasteners, such as self-tapping screws 60, hold the ends of the forward end wall section 55 in tightly against the outer surfaces of the rear wall sections 53, 54.

The rear wall sections 53, 54 are interconnected at their rear ends by tabs or projections 62, 63 which comprise integral extensions of the web of the wall sections. The tabs 62, 63 are bent to lie parallel to each other and along the longitudinal axis of the unit to permit them to be connected together as by metal screws 64. Preferably, one of the tabs or projections 63 is longer than the other of the tabs or projections 62 to permit a tight joint to be made by bending the longer tab 62 around the end portion of the second tab 62 as illustrated in Fig. 9 of the drawings. This not only strengthens the connection but also seals it.

This modified construction of Figs. 7 and 8 is used in the same manner as that shown in Fig. 2, and may be provided with an opening 38 and cover 39 for filling the unit with heat retaining material.

As shown in Fig. 1, one or more of the heat storage units may be mounted in the flow channels of the heat transfer medium of the furnace. Preferably, the unit is placed on the discharge of high temperature side of the heating device. In the hot-air type furnace 10 of Fig. 1, the heat storage units 11 are suspended in the plenum chamber or distributing portion of the air space above the combustion chamber. Although but two units 11 are illustrated in Fig. 1, it will be understood that more or less units may be used if desired. In general, as many units will be used as space in the furnace plenum chamber will permit.

The heat storage units may be mounted by any desired fastener or bracket arrangement. One such bracket arrangement is shown in Fig. 2 and comprises a metal strip 45 fastened centrally of its length to the end wall 25 of the unit by screws 46. The two end portions 47 of the bracket strip 45 are offset outwardly from the wall of the unit and have holes for receiving fasteners of any suitable form. The bracket 45, or other mounting device, may be attached directly to the walls or braces of the heater or furnace. If this is not feasible, separate supporting means such as crossbar 48 may be mounted on the furnace walls or duct work and the units either suspended therefrom or supported upright on an openwork platform 49 as in Fig. 1.

The preferred form of mounting for the units 11, 50 is shown in Figs. 11, 12 and 13 of the drawings. In this construction an upwardly opening channel 66 is provided to support the weight of the units, and connecting brackets 67 are used to space and hold the upper or rear end portions of units. In more detail, the channel 66 has its bottom or web section 68 perforated to form apertures 69 permitting the passage of air through the channel, as well around the channel, into contact with the units. The upwardly projecting legs 70 of the channel have upwardly opening, alined grooves 71 in their outer or upper edge portions to receive the flanges 27, 58 of the heat storage units. The grooves 71 are formed in sets of four comprising a pair of grooves on each leg 70 of the channel which are spaced lengthwise of the channel a distance equal to the spacing of the flanges on the units. Each flange of the unit is received by two grooves, one on each leg, to give a four point support for the unit. The channel 66 may be suspended or fixed to the furnace walls or duct work in any suitable manner.

Connecting brackets 67 are provided for holding the upper or rear portions of the units 11, 50 in spaced and upright position. For this purpose, the brackets are of U-shape with outwardly projecting feet 72, 72a on the ends of the legs 73. The legs 73 are of a length substantially equal to the height of the flanges 27, 58 on the units, while the back 74 of the bracket is substantially equal in length to the spacing between the sets of grooves in the channel member 66. Mounting holes 75 are provided in the feet 72 for fastening the brackets to the web of the end walls of the units by suitable screws 76. If desired for greater lateral stability, one of the feet 72a may have a pair of mounting holes 75 to prevent twisting or turning of the bracket relative to the unit and hence hold the units in a substantially fixed parallel relationship.

In some instances it may be desirable to have additional means for holding the units in place on the channel support 66. Such additional means are of particular advantage where the units cannot be placed upright because of insufficient head room in the furnace, and are mounted in a slanting position. As illustrated in Figs. 11 and 12 of the drawings, the legs 70, 71 of the channel member 66 are provided with horizontally extending apertures 78 adjacent their upper ends. An aperture 78 is provided on each leg opposite each unit for receiving a screw fastener 79, preferably of the self-tapping type, which engages the web or end wall sections 25, 55 of the units. In this manner, the units may be held firmly on the channel member 66 in a tilted or slanting position as well as restrained against upward movement.

I claim as my invention:

1. A heat retaining device comprising in combination, a pair of parallel side wall panels formed of sheet material and spaced from each other, an end wall of sheet material interposed between said side panels and extending about the periphery of the latter to form a closed chamber, the marginal edge portions of said end wall and of said side panels having a continuous detachable slip connection therebetween, a detachable juncture between the ends of said end wall to permit expanding the contracting the end wall for inserting the marginal portions of said side panels in said connections, said end wall defining an opening therein to permit filling said closed chamber with heat retaining material, a cover flap for said opening formed of sheet metal and of greater area than said opening, and means for holding said flap in abutting engagement with the outer face of said end wall.

2. A heat retaining device comprising in combination, a pair of side panels spaced from each other, said panels being of sheet metal and of teardrop shape, a rim section of sheet metal interposed between said side panels and extending about the periphery of the latter to form a closed chamber, the marginal edge portions of said rim section being bent outwardly at substantially right angles to said rim portion and then inwardly to form an inwardly opening groove having a width substantially equal to the thickness of said side panels for receiving the marginal portions thereof, a detachable connection between the ends of said rim section to permit expanding said rim section for inserting the marginal portions of said side panels in said grooves, said connection including transverse slots defined by one end portion of said rim section and corresponding positioned fingers projecting longitudinally from said second end of the rim section for insertion in said slots, said rim section defining an opening therein to permit filling said closed chamber with heat retaining material, a cover flap for said opening formed of sheet metal and rectangular in shape, said rim section defining a pair of transverse slots extending from opposite sides of said fill opening, said cover flap having an end portion offset inwardly for insertion in said slots and having the other end portion overlying said fill opening, and a fastener for holding one end portion of said flap in abutting engagement with the face of said rim section.

3. The heat retaining device recited in claim 1 in which, the pair of side wall panels are of teardrop shape in outline, and the combination including a quantity of heat retaining material substantially filling said closed chamber.

4. A heat storage assembly for use with heating devices comprising in combination, a plurality of heat storage units having a pair of plane, parallel side walls of teardrop shape and a marginal end wall enclosing the space between said side walls, said end walls having outwardly extending flanges adjacent the edges thereof, an upwardly opening channel shaped support member having upstanding legs, said legs defining upwardly opening transverse grooves therein, said grooves being arranged in sets of four including a pair of grooves on each leg spaced apart a distance equal to the spacing of said flanges, each of said heat storage units being positioned on said supporting member with the flanges thereof received in one set of grooves, and means for interconnecting adjacent ones of said units at a point removed from said channel supporting member to hold said units in spaced relation corresponding to the spacing between sets of said grooves.

5. The assembly claimed in claim 4 in which said channel support member has a perforated web to provide air passages through said web and said interconnecting means comprises a U-shaped bracket having a pair of legs and outwardly extending feet thereon, and metal screw fasteners for holding each of said feet to the marginal end wall of adjacent units.

6. In a heating system having an enclosed heat generating unit and means for circulating air past said unit and through a passageway to the region to be heated, a heat storage assembly comprising, in combination, a heat retaining device having a pair of sidewall panels of sheet material spaced from each other, said panels being of teardrop outline and connected by a rim section sheet material interposed between said side panels and extending about the periphery thereof to form a closed chamber between said sidewalls, a quantity of heat retaining material substantially filling and being contained by said closed chamber, and means for suspending said device and the material contained therein in said passage so as to store heat when said heater is operating at high temperatures and to supply heat to the passing air when the heater is not operating at high temperatures, thus tending to stabilize the heat output of the system.

7. The combination defined in claim 6, in which said side wall panels have an arcuate forward end portion and tapered edges terminating at a point on the rear portion thereof, and said rim section having a first portion extending about the forward end portion of said side walls and second and third portions extending from respective ends of said first portion to a common juncture at the rear end of said side walls, each of said rim section portions having outwardly projecting flanges at the edge thereof, said flanges defining inwardly opening grooves to receive the marginal edges of said side walls, said first rim portion overlapping the adjacent end portions of said second and third portions and being fastened to the outer surface thereof, the common juncture of said second and third portions being formed by extensions of the latter portions bent to project generally parallel to each other, one of said extensions being longer than the other and folded over the end of said other extension.

References Cited in the file of this patent

UNITED STATES PATENTS

| 746,956 | Grantham | Dec. 15, 1903 |
| 2,169,892 | Bevington | Aug. 15, 1939 |
| 2,236,538 | Kuenhold | Apr. 1, 1941 |
| 2,364,698 | Davin | Dec. 12, 1944 |
| 2,661,118 | Benninghof | Dec. 1, 1953 |

FOREIGN PATENTS

| 157,507 | Australia | July 7, 1954 |